United States Patent

[11] 3,596,175

[72] Inventor  Andrew Alford
              Winchester, Mass. 01890
[21] Appl. No. 756,734
[22] Filed     Aug. 23, 1968
[45] Patented  July 27, 1971
               Continuation-in-part of application Ser. No.
               391,337, Aug. 21, 1964, now abandoned.

[54] ELECTRICAL MEASURING APPARATUS FOR PROVIDING AN OUTPUT SIGNAL AT AN OUTPUT BRANCH CHARACTERISTIC OF THE RELATIONSHIP OF IMPEDANCES PRESENTED AT FIRST AND SECOND SIDE BRANCHES AT THE FREQUENCY OF ENERGY APPLIED AT AN INPUT BRANCH
4 Claims, 2 Drawing Figs.

[52] U.S. Cl. .................................... 324/58 A,
                                                324/57
[51] Int. Cl. ..................................... G01n 27/04
[50] Field of Search............................ 324/57 B,
                                          57, 58 A, 58 B, 119

[56]              References Cited
                UNITED STATES PATENTS
2,394,892   2/1946   Brown....................... 324/57 UX
2,521,522   9/1950   Keitley ....................... 324/119 X
3,278,840  10/1966   Wilson ........................ 324/57

OTHER REFERENCES
Montgomery. Technique Of Microwave Measurement. in M.I T Radiation Lab Series Vol 11, (1947) pp. 81— 85 (Copy in group 250 class 324 sub 104)

*Primary Examiner*—Edward E. Kubasiewicz
*Attorney*—Wolf, Greenfield and Hieken

ABSTRACT: A radio frequency signal source delivers a signal to an input branch through a harmonic filter to provide an output signal on an output branch indicated by indicating means representative of the difference in impedance between a standard impedance connected to one side branch and an unknown impedance connected to the other side branch. A pair of equal resistances connect the high terminal of the input branch to the respective high terminals of the respective side branches. A higher resistor intercouples the high terminals of the side branches so that when the side branches are terminated in their characteristic impedance, typically 50 ohms, the impedance presented at the input branch is substantially equal to the input branch characteristic impedance, typically 50 ohms. Means including isolating resistors and a bridge circuit couples the side branch high terminals to the output branch high terminal, all four branches having low, or grounded terminals, that are interconnected.

PATENTED JUL 27 1971 3,596,175

INVENTOR:
ANDREW ALFORD

BY,
Wolf, Greenfield + Hicken
ATTORNEYS

ELECTRICAL MEASURING APPARATUS FOR
PROVIDING AN OUTPUT SIGNAL AT AN OUTPUT
BRANCH CHARACTERISTIC OF THE RELATIONSHIP
OF IMPEDANCES PRESENTED AT FIRST AND SECOND
SIDE BRANCHES AT THE FREQUENCY OF ENERGY
APPLIED AT AN INPUT BRANCH

This application is a continuation-in-part of application Ser. No. 391,337 filed Aug. 21, 1964 now abandoned.

BACKGROUND OF THE INVENTION

The present invention related in general to electrical measuring and more particularly concerns novel techniques for deriving an output signal representative of the relationship between a pair of impedances over a wide frequency range at VHF, HF, UHF or microwave frequencies. Measuring apparatus according to the invention is relatively easy and inexpensive to fabricate, yet provides remarkable accuracy over a wide frequency range.

It is an important object of this invention to compare a pair of impedances over a relatively wide frequency range.

It is another important object of the invention to achieve the preceding object by providing a signal representative of the difference between a pair of impedances over a wide frequency range.

It is still another object of the invention to achieve the preceding objects with apparatus which is relatively inexpensive and easy to fabricate while carrying out measurements with a degree of accuracy.

It is still another object of the invention to achieve the preceding objects with apparatus that is relatively easy to operate by unskilled personnel.

SUMMARY OF THE INVENTION

According to the invention an electrical circuit provides an output signal at an output branch characteristic of the relationship of impedances presented at first and second side branches at the frequency of energy applied at an input branch. Each branch has a high terminal and a low terminal. Means, such as a shield, intercouple the low terminals to maintain them at substantially the same reference potential, typically ground potential. Means including a first resistance intercouple the first side branch and the input branch high terminals. Means including a second resistance intercouple the second side branch and the input branch high terminals. Means including a third resistance intercouple the first side branch and the second side branch high terminals. Detecting means intercouple the first and second side branch high terminals with the output branch high terminal for providing a signal on the output branch high terminal representative of the difference of potential between the first side branch and the second side branch high terminals. The input branch may be characterized by an input branch characteristic impedance. Preferably, the first, second and third resistances coact to present the input branch characteristic impedance to the input branch when the side branches are each terminated in the side branch characteristic impedances while then being arranged to transfer equal amounts of energy from the input branch to each of the side branches to then produce substantially no difference in potential between the first side branch and the second side branch high terminals.

In a specific form of invention, the detecting means comprises a bridge circuit having four unilaterally conducting devices cascaded to define first, second, third and fourth consecutive junctions. Means maintain the first junction substantially at reference or ground potential. Means maintain the output branch high terminal substantially at the potential of the third junction. Means including a fourth resistance couple the first side branch high terminal to the second junction, and means including a fifth resistance couple the second side branch high terminal to the fourth junction. The resistance of each of the fourth and fifth resistances is preferably high compared to that of the side branch characteristic impedance to prevent the bridge circuit from appreciably affecting the impedance presented to the side branches and the input branch.

Numerous other features, objects and advantages of the invention will become apparent from the following specification when read in connection with the accompanying drawing, in which:

DETAILED DESCRIPTION OF PREFERRED EMBODIMENTS

Figure 1:
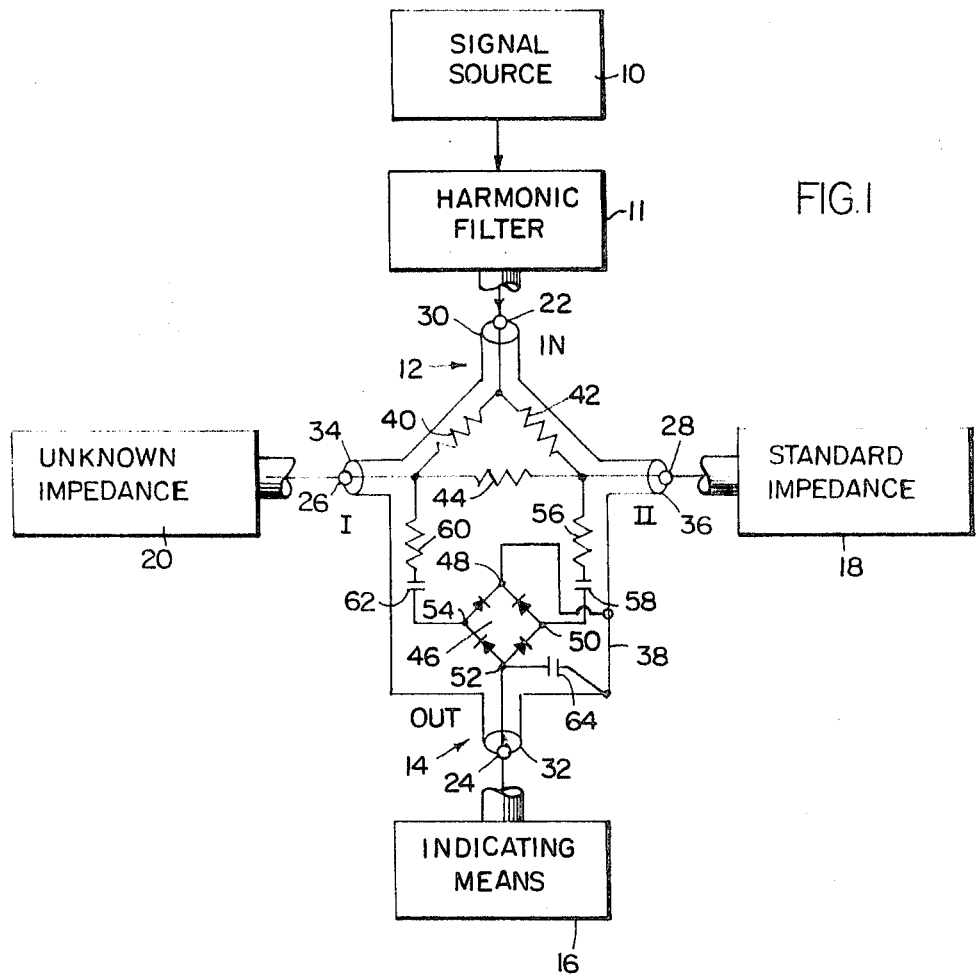
FIG. 1 shows a combined block-schematic representation of the complete measuring system embodying the inventive concepts.

With reference now to FIG. 1 of the drawing, there is shown a combined block-schematic diagram illustrating the arrangement of the complete measuring system incorporating the principles of the invention. A signal source 10, typically a modulated or unmodulated radio frequency signal source, delivers a signal to the input branch 12 through harmonic filter 11 to provide an output signal on output branch 14 indicated by indicating means 16, which may be an ordinary meter, representative of the difference in impedance between standard impedance 18, connected to side branch II, and unknown impedance 20, connected to side branch I, at the frequency then emitted by signal source 10.

Each of the four branches 12, 14, I and II include low terminals 30, 32, 34 and 36, respectively. Typically these branches are coaxial as shown and may have characteristic impedances of the order of 50 ohms. The low terminals are typically intercoupled by the conductive casing 38 which may typically be a conducting shield in which the components are enclosed, and the various branches are brought out through conventional coaxial terminal pairs.

A first resistance 40 intercouples high terminals 22 and 26 of input branch 12 and side branch I. A second resistance 42 intercouples high terminals 22 and 28 of input branch 12 and side branch II, respectively. A third resistance 44 intercouples high terminals 26 and 28 of side branches I and II. Resistances 40 and 42 have substantially the same values. Resistance 44 is such that when side branches I and II are terminated in their characteristic impedance, typically 50 ohms, the impedance presented at the input branch 12 is substantially equal to the input branch characteristic impedance, typically also 50 ohms.

Detecting means comprises a diode bridge 46 with four cascaded diodes intercoupling the four junctions 48, 50, 52 and 54. The first junction 48 is connected to case 38. The third junction 52 is connected to high terminal 24 of output branch 14. The second junction 50 is coupled to high terminal 28 of side branch II by a resistor 56 and a capacitor 58. The fourth junction 54 is coupled to high terminal 26 of side branch I by resistor 60 and capacitor 62. A bypass capacitor 64 is connected between the fourth junction 52 and ground. The resistance of resistors 56 and 60 are preferably larger than the characteristic impedances of the side branches so that the bridge circuit impedance which depends on the impedances of the diodes has little effect on the impedance presented by the network as seen looking into either of the two side branches.

Having described the arrangement of the system, its mode of operation will be described. It is first convenient to assume that both side branches I and II are terminated in equal resistances corresponding to the characteristic impedance of these side branches. Energy applied to input branch 12 then divides equally between the two side branches I and II so that the signal amplitudes on high terminals 26 and 28 are substantially equal to produce substantially no difference in potential between junctions 50 and 54 of bridge circuit 46. If the unknown impedance 20 is higher than that of standard impedance 18, the signal amplitude on high terminal 26 is greater than that on high terminal 28. There will also be a corresponding difference in potential between the junctions 50 and 54 of bridge circuit 46, and consequently a corresponding difference of low frequency potential between junction 52 and the outer case 38. The difference of potential between junction 52 and the case 38 will also exist when the unknown impedance 20 is smaller than the standard impedance 18. The magnitude of this potential is related to the magnitude of the reflection coefficient of the unknown impedance with respect to the standard impedance. The indicating means 16 may be calibrated to indicate reflection coefficient magnitude or VSWR directly.

It can be shown that if the indicating device 16 is to indicate the VSWR independently of the position of the standing wave along the line, it is necessary that the impedances seen looking into the side branches be substantially equal to the characteristic impedance of the transmission line connected to, for example, branch 34, 26, along which the VSWR is to be measured.

We now consider the impedance seen looking into port 26, 34, that is, the impedance seen looking back from the unknown into the bridge. It will be assumed that the bypass condensers 58, 62 and 64 are sufficiently large so that their impedances are small in comparison with the resistances 60 and 56. It will also be assumed that the diodes in the balanced rectifier bridge are small and that their impedances are essentially resistive. Let the resistance seen looking from capacitor 58 into the diode bridge be $R_3$. Let the resistance of resistor 56 be $R_4$, the resistance of resistor 42 be $R_1$, and the resistance of resistor 44 be $R_2$. Let it be assumed that the bridge is symmetrical with respect to the line drawn from 22 to 24 so that resistor 40 is equal to resistor 42, resistor 60 is equal to resistor 56. The resistance seen looking into the diode bridge from junction 54 of value $R_3$ is the same as the resistance seen looking into the diode bridge from junction 50, and the resistance from each of side terminals 26 and 28 to junction 48 is $R_3 + R_4 = R_5$.

The purpose of the following calculations is to derive the resistance seen looking into the side port, such as 26, 34 in FIG. 1.

To simplify the calculations, consider a circuit in which a generator of voltage E and source impedance $Z_o$ terminates 24, 32, and respective impedances of $Z_o$ terminate 28, 36 and 22, 30. Voltage $V_2$ on and consequently current $i_o$ through terminal 22 can be easily found because there is no current through $R_2$ (because of the equality of the voltages on the two sides of the circuit).

The resistance presented to the generator of voltage E is $R''=\frac{1}{2}(R_1+R')$ where $R'=Z_o R_5/Z_o+R_5$, the parallel combination of $Z_o$ and $R_5$.

The voltage $V_1$ at terminal 26 is then $ER''/Z_o+R''$. And $V_2=V_1R'/(R_1+R')=R'R''E/(R_1+R')(R'+Z_o)$. The current $i_o=V_2/Z_o$.

By applying the principles of reciprocity we may interchange current $i_o$ with the generator with the result that $V_2$ is the voltage at the junction of resistors 40 and 42 and the current flowing from terminal 26 is of value $i_o$ with the equivalent resistance $R'$ connected from terminal 26 to the case 38. $V_2$ is then the voltage at the junction of the resistors 40 and 42 of value $R_1$.

If we assign a current of value $i_1$ flowing through resistors 42 from the junction of resistors 42 and 44 to the junction of resistors 40 and 42 and a current of value $i_2$ through resistor 44 from the junction of resistors 42 and 44 to the junction of resistors 40 and 44, applying Kirchoff's law about the loop consisting of resistors 40, 42 and 44 yields $$R_1(2i_1-i_o)-R_2 i_2=0, \quad (1)$$

the voltage across resistor 40 being $R_1(i_1-i_o)$.

The potential $V_3$ at the junction of resistors 40 and 44 is $$V_3=R'(i_2+i_1-i_o), \quad (2)$$

the algebraic sum of the currents flowing from that junction into the parallel combination of resistances of value $Z_o$ and $R_5$, this parallel resistance being $R'$.

The potential $V_2$ at the junction of resistors 40 and 42 is determined in a similar manner as $$V_2=R'(i_2+i_o)+R_1(i_1-i_o). \quad (3)$$

Then the potential $V_o$ at the junction of resistors 42 and 44 is $$V_o=V_2+i_1 R_1. \quad (4)$$

Also, $$V_o=E-Z_o(i_5+i_2+i_1). \quad (5)$$

From equations (1) (3), (4) and (5) it is found that $$V_o=\left[1+\frac{2+u(1+q)}{1+u(2q+1)}\right][uE/(3+u)] \quad (6)$$

where $$u=R'/Z_o \text{ and } q=Z_o/R_2. \quad (7)(7)$$

When the side input $I$ is matched to $Z_o$, $$V_o=E/2 \quad (8)$$

From (8) and (6) we can find $u$ for a given value of $q$. For example, in the specific embodiment of the invention with resistors 40 and 42 of resistance $R_1$ 50 ohms and resistor 44 of resistance $R_2$ 60 ohms and $Z_o$ 50 ohms, $q=1/1.2$ or 0.835.

$$u=-(2-6q)/2(3+4q)\pm\sqrt{[(2-6q)/2(3+4q)]^2+2/(3+4q)}$$
$$u=0.939=R_5/(Z_o+R_5).$$

Therefore, $R_5=769$ ohms.

In the specific example resistors 56 and 60 are 400 ohms, and each side branch is perfectly matched if the diode or bolometer bridge impedance as seen from each side were 369 ohms. This is approximately what the diode bridge impedance is for low currents and small diodes, such as the type 1N23 or 1N270 diodes.

The arrangement of the present invention includes decoupling resistors such as 60 and 56 which reduce the effect of the variable impedances of the diodes so that the side branch impedances remain substantially constant even when the power of the RF signal from source 10 is varied.

The rectifying arrangement is deliberately made balanced so that it would have equal effects on the RF impedances of the branches. This is desirable even though the decoupling resistors referred to above would reduce the unbalancing effects dissymetry, if any, to a lower value.

In an exemplary embodiment of the invention, resistors 40 and 42 are 50 ohms, resistor 44 is 60 ohms, resistors 56 and 60 are 400 ohms, capacitor 58 and capacitor 62 are 100 picofarads, capacitor 64 is 200 picofarads for frequency range 100 mc.—1000 mc. The diodes of bridge circuit 46 are type 1N23 or 1N270 diodes. The input, output and side branches comprise conventional Type N coaxial terminals.

Figure 2:
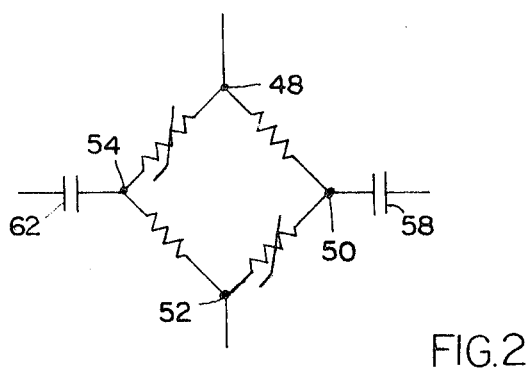
FIG. 2 shows a schematic circuit diagram of a modified measuring bridge.

In an alternate arrangement (shown in FIG. 2) two diodes in the diode diamond are replaced with two bolometers and the remaining two with resistors (See FIG 2). In this case the oscillator (source 10) must be amplitude modulated with a square wave or sine wave at say 1000 c.p.s.

There has been described novel techniques for accurately comparing impedances over a wide frequency range with relatively simple apparatus easily operated by unskilled personnel. It is apparent that those skilled in the art may now make numerous modifications of and departures from the specific embodiment described herein without departing from the inventive concepts. Consequently, the invention is to be construed as limited solely by the spirit and scope of the appended claims.

What I claim is:

1. In an electrical circuit, operative over a broad band of frequencies, for providing an output signal related to the difference in impedance presented by an unknown impedance connected to a first side branch by a transmission line and a standard impedance connected to a second side branch, the electrical circuit being of the type having an input branch for accepting an AC input signal,
a first resistor connected between the input branch and the second side branch,
a second resistor connected between the input branch and the second side branch,
a third resistor connected between the side branches to form a delta circuit with the first and second resistors, detecting means for detecting the difference in electrical potential between the side branches, and means coupling the detecting means to the side branches, the improvement wherein the means coupling the detecting means to the side branches comprise resistors which provide appreciable impedance at the higher frequencies in the broad band where the impedance of the detecting means falls to a low value, and the third resistor in the delta circuit differs from the value of the other two resistors in the delta circuit, the value of the third resistors being such as to cause the impedance seen looking into the first side branch to match, over a large portion of the broad band, the characteristic impedance of the transmission line connecting the unknown impedance to the first side branch.

2. The electrical circuit according to claim 1, wherein the improvement further is characterized in that the standard impedance has a value matching the characteristic impedance of the transmission line which is connected to the first side branch.

3. The electrical circuit according to claim 1, the improvement being further characterized by a full wave rectifying bridge in the detecting means, the rectifying bridge being balanced with respect to the the side branches to cause the rectifying bridge to have an equal effect upon the impedance seen looking into each side branch, and an indicator connected across diagonally opposite junctions of the bridge to cause the indicator to respond to the rectified current flowing in the bridge.

4. The electrical circuit according to claim 1, the improvement being further characterized by a bridge in the detecting means, the bridge being formed by four resistive arms, the resistive elements in two arms of the bridge being bolometers, and the bridge being balanced with respect to the side branches to cause the bridge to have an equal effect upon the impedance seen looking into each side branch.